July 10, 1945.   J. R. FRANTZ   2,380,226
AUTOMATIC COMPRESSOR REGULATOR
Filed Aug. 18, 1941
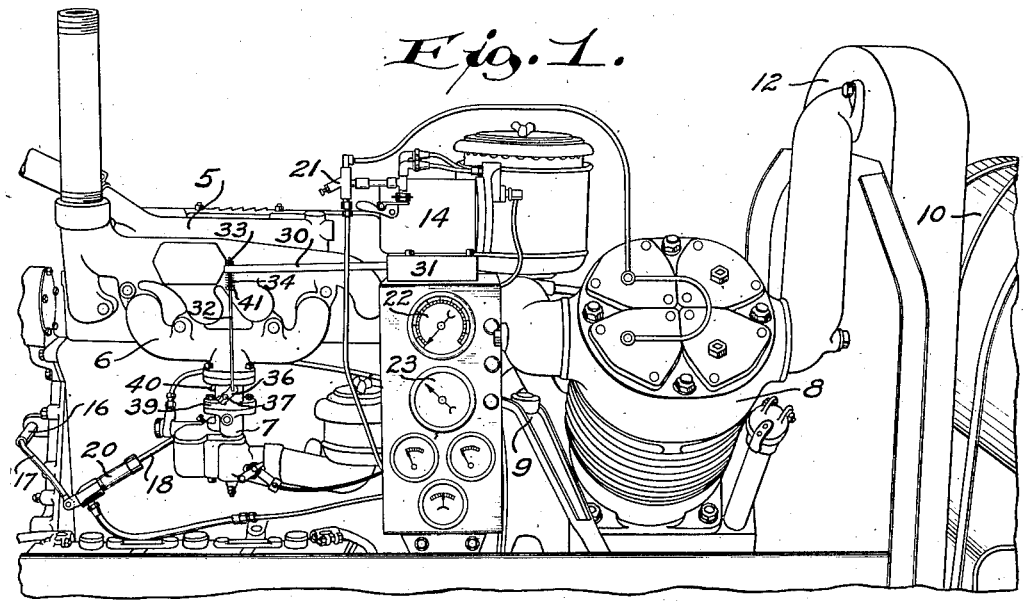
Fig. 1.
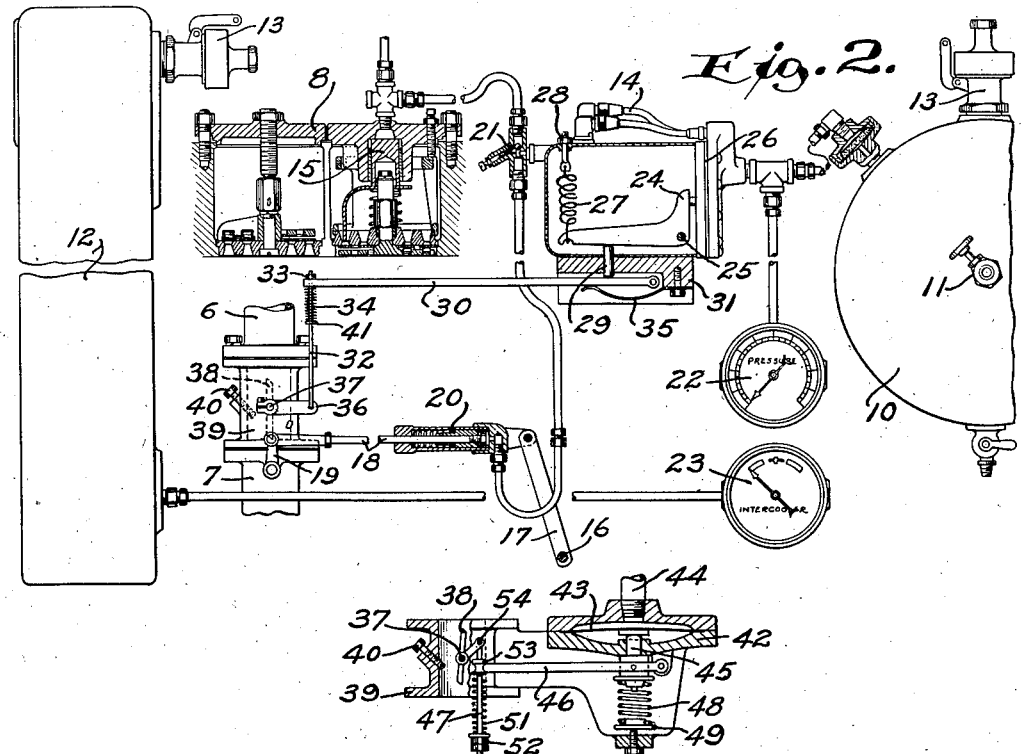
Fig. 2.
Fig. 3.
INVENTOR.
J. R. Frantz
BY
Lieber & Lieber ATTORNEYS.

Patented July 10, 1945

2,380,226

UNITED STATES PATENT OFFICE 2,380,226

AUTOMATIC COMPRESSOR REGULATOR

John R. Frantz, Wauwatosa, Wis., assignor to Le Roi Company, West Allis, Wis., a corporation of Wisconsin Application August 18, 1941, Serial No. 407,263

4 Claims. (Cl. 230—5)

The present invention relates in general to improvements in the art of controlling the operation of fluid pumping systems or the like, and relates more specifically to improvements in the construction and operation of automatic regulators for controlling the speed of internal combustion engines or similar motors while driving air compressors or similar pumping apparatus.

An object of the invention is to provide an improved automatic compressor regulator, which is simple in construction and efficient in operation.

It has heretofore been common practice to utilize fluid pumping systems of the type comprising an internal combustion engine driven air compressor equipped with an automatic unloading device and slow down device for controlling the minimum engine speed, and also provided with a governor for controlling the maximum speed of the engine. With such a system, when the compressor is unloaded the slow down device automatically reduces the engine speed to a definite minimum, whereas when the compressor again becomes active the speed governor functions to restore the engine speed to its predetermined maximum; but no proper provision is made for regulating or varying the engine speed according to the actual demand for compressed air. If the demand for air is light, the speed of the engine is subject to rather frequent and extreme variations from minimum when idling to maximum when pumping, and vice versa, and the operation of an internal combustion engine under such conditions is far from being efficient or economical. While it has heretofore been proposed to obviate this difficulty by causing variations in the demand for air to vary the engine speed through the speed governor, this type of regulation is objectionable because it is not direct and independent of the other controls.

It is therefore a more specific object of my present invention to provide an improved control system for internal combustion engine driven air compressors, whereby the compressor will be automatically unloaded when the air pressure reaches a definite or predetermined amount, and the engine speed is varied in accordance with the demand for air, and the maximum speed of the engine is controlled independently of the other controls.

Another specific object of this invention is to provide new and useful regulating means for a motor-driven pump unit or the like, which will automatically vary the speed of the unit in accordance with load changes so as to produce most efficient operation of the assemblage under varying conditions.

A further specific object of the invention is to provide an improved fluid pressure actuated regulator for engine driven compressors, which will permit operation of the engine at any appropriate speed during the normal operation of the compressor whether the latter is subjected to light or heavy load.

Still another specific object of the present invention is to provide a control system for internal combustion engine driven air compressors, whereby the engine may operate at any speed from a predetermined minimum to a predetermined maximum while pumping, and wherein the actual engine speed is regulated automatically in accordance with variations in the compressor output.

An additional specific object of my present invention is to provide an improved regulator which may be quickly and conveniently applied as an attachment to motor-driven compressor units, and which will function in cooperation with but independently of the unloading device and speed governor of such a unit, to most effectively control the operation thereof.

Another object of the invention is to provide improved instrumentalities for automatically controlling the normal operation of engine driven compressors, which are simple, compact and durable in construction, readily adjustable to meet various conditions of operation, and highly efficient and flexible in use.

A further specific object of this invention is to provide an additional control for motor compressor installations already equipped with standard unloaders and speed governors, which will vary the load speed of the compressor unit automatically and in inverse proportion to the receiver pressure.

These and other specific objects and advantages of the invention will be apparent from the following detailed description.

A clear conception of an embodiment of my invention as applied to an internal combustion engine driven air compressor unit, may be had by referring to the drawing accompanying and forming a part of this specification wherein like reference characters designate the same or similar parts in the several views.

Fig. 1 is a side perspective view of an internal combustion engine driven two-stage air compressor installation, having my improved air pressure actuated speed regulator applied thereto in addition to and independently of the unloading device and normal speed governor;

Fig. 2 is a diagram of the improved speed and pressure control system for an installation such as shown in Fig. 1; and Fig. 3 is a modified pressure actuated control unit embodying the invention.

While the invention has been shown and described herein as having been specifically embodied in a relatively standard and portable internal combustion engine driven air compressor installation of the two stage type, it is not intended to thereby unnecessarily limit the scope or utility of the improvement which may be advantageously applied to other types of fluid pumping systems.

Referring to Figs. 1 and 2 of the drawing, the relatively standard portable pumping installation shown therein, comprises in general a multi-cylinder internal combustion engine 5 having a gas supply or inlet manifold 6 communicating with a carburetor 7; a two-stage radial cylinder air compressor 8 having its driving shaft disposed in axial alinement with the engine shaft, and adapted to be drivingly connected therewith by means of clutch mechanism 9; a compressed air receiver 10 connected to the high pressure discharge chamber of the air compressor 8 and being provided with an outlet valve 11; an intercooler 12 associated with the compressor 8, both the receiver and intercooler being provided with safety valves 13; an unloader pilot assemblage 14 interposed between the receiver 10 and the suction valve unloaders 15 of the compressor cylinders; a speed governor 16 for the engine 5 connected by a lever 17, connection 18, and lever 19 to the control valve in the engine carburetor 7; an air pressure actuated slow down assembly 20 interposed in the governor connection 18 and being connected to the receiver 10 through the pilot assemblage 14; and a combined check and bleeder valve 21 disposed between the unloader pilot 14 and the suction unloaders 15 and slow down assembly 20. The receiver 10 and intercooler 12 are also provided with pressure indicating gauges 22, 23 respectively, and as previously indicated, the installation thus far described is relatively standard and of well known construction.

The unloading pilot assemblage 14 of the unloader control system, includes a crank lever 24 swingably suspended from a pivot pin 25 and having a short arm subjected to receive air pressure through a flexible diaphragm 26, and also having a longer arm the swinging end of which is restrained against movement by an adjustable tension spring 27 the tension of which may be varied by manipulating an adjusting nut 28. The motion of the lever 24 may be transmitted in a well known manner, as for example in U. S. Patent No. 1,416,092, granted May 16, 1922, so as to actuate the valve 21 and unloaders 15, and in accordance with one embodiment of the present invention, it is also possible to utilize the motion of the diaphragm 26 and lever 24 to actuate my improved fluid pressure actuated speed regulator. Such embodiment is shown in Figs. 1 and 2, wherein the long arm of the lever 24 coacts through a pin 29 with the medial portion of a lever 30, one end of which is pivotally suspended from a bracket 31 while its opposite end coacts with a rod 32 through a nut 33 and a compression spring 34. The lever 30 is constantly resiliently urged against the pin 29 by a leaf spring 35, and the lower end of the rod 32 is attached to an arm 36 secured to the pivot shaft 37 of a butterfly valve 38. This butterfly valve 38 is located within a fitting 39 which is interposed between the intake manifold 6 and the fuel supply carburetor 7, and the valve 38 is also preferably provided with an adjustable stop 40 which positively limits the closing movement of the valve. The compression spring 34 which coacts with the swinging end of the lever 30, reacts against a collar 41 adjustably attached to the rod 32, and this spring serves to permit over-travel of the lever 30 in a downward direction, when the valve 38 has engaged the limit stop 40. The control valve 38 which is operable directly by variations in demand for compressed air at the receiver 10, is provided in addition to the ordinary throttle valve of the carburetor 7, and is adapted to regulate or control the explosive mixture or fuel entering the intake manifold 6, thereby also regulating the speed of the engine 5 independently of the limit speed governor 16.

During normal operation of the improved engine driven compressor installation, when the internal combustion engine 5 is first placed in operation, and assuming the pressure in the receiver 10 to be low, the clutch 9 will be disconnected until the engine is warmed up and operating normally under control of the speed governor 16. When the engine 5 is operating properly, the clutch 9 may be thrown in and the compressor 8 will then function to deliver air under pressure to the receiver 10. As soon as the fluid pressure in the receiver 10 has reached the predetermined maximum for which the spring 27 and nut 28 have been adjusted, the unloading device 15 will function to automatically unload the compressor 8 by holding the suction valves open, until the pressure in the receiver 10 drops to the predetermined minimum for which the unloader pilot 14 has been set, whereupon the unloader 15 will again become inactive and compressed air will again be delivered to the receiver 10. Whenever the unloading device 15 becomes active, the engine 5 will naturally be subjected to lesser load, and the normal speed governor 16 will then reduce the engine speed to the minimum predetermined value, and when the unloader 15 becomes inactive the speed governor will cause the engine speed to increase to its maximum, and such operation is satisfactory when the demand for compressed air is great and practically up to full compressor capacity.

However, if the demand for air is light, the engine 5 would be operating either at low or high speed and very inefficiently, unless means are provided for controlling the speed in accordance with the actual demand, and such regulation is effected by the improved pressure actuated regulator. Under such conditions of operation, the air pressure in the receiver 10 will vary according to the demand, and will act through the lever 24, pin 29, lever 30, rod 32, arm 36, and shaft 37 to set the butterfly valve 38 in the fitting 39, so as to vary the quantity of fuel admitted to the engine 5 through the intake manifold 6, inversely proportional to variations in receiver pressure. As the receiver pressure drops, the engine speed will be proportionately increased; and as the receiver pressure increases, the engine speed will be proportionately decreased, and the speed governor 16 will function automatically only in order to determine or to limit the maximum engine speed. Under these conditions of speed control directly by air demand, the compressor 8 may continue to operate without being unloaded, but the unloader 15 will automatically function when the pressure in the receiver 10 reaches the predetermined maximum value. The engine 5 is thus caused to operate at its most efficient speed as determined by receiver pressure variations, and the improved regulator functions independently of the unloader 15 and of the normal speed governor 16.

While the improved automatic pressure actuated speed regulator which has just been described in detail, has proven entirely satisfactory in actual operation, it is associated with the unloader pilot 14 and requires some modification of standard equipment for its proper installation. In order to avoid such modification and to facilitate installation of the improved device, I may provide a pressure actuated speed regulator unit such as shown in Fig. 3. This improved and simplified unit comprises a bracket 42 formed integral with the valve fitting 39 and providing a support for a diaphragm 43 which is exposed directly to receiver pressure through a pipe 44; a member 45 slidable in the bracket 42 by the diaphragm 43 and being pivotally connected to the medial portion of a lever 46 one end of which is swingably suspended from the bracket 42 and the opposite swinging end of which loosely embraces a rod 47; a compression spring 48 coacting with the movable member 45 and reacting against a plate 49 which is adjustable by means of a set screw 50 to vary the spring tension; an adjustable spring 51 embracing the rod 47 and coacting with the lever 46 and with adjusting nuts 52 to force the lever end against an abutment 53 on the rod 47; and an arm 54 connecting the upper end of the rod 47 with the supporting shaft 37 of the butterfly valve 38. The adjustable spring 48 constantly urges the member 45 against the diaphragm 43 and the lever 46 upwardly so as to maintain the valve 38 fully opened when the receiver pressure is low, and when the receiver pressure approaches the maximum predetermined value at which unloading of the compressor will occur, the valve 38 will engage the stop 40 and the swinging end of the lever 46 will leave the abutment 53 and will thereafter compress the spring 51. This modified device which can readily be inserted as a unit in a standard motor driven compressor installation obviously functions the same as the regulator of Figs. 1 and 2, to open and close the valve 38 and to thereby admit more or less fuel to the internal combustion engine, in accordance with variations in the demand for compressed air.

From the foregoing detailed description of the several modifications, it should be apparent that the present invention provides an improved fluid pressure actuated regulator functioning independently of the unloading device and normal speed governor, to automatically control the engine speed in accordance with variations in the demand for compressed air. The improved units are extremely simple and durable in construction, may be readily installed and manipulated, and insure operation of the engine and compressor at maximum efficiency at all times. The adjustments for effecting variation in performance to meet different conditions of operation, may be quickly, conveniently and safely performed, and the improved control unit is readily applicable to standard motor driven compressor installations to vastly improve the operation thereof and at very little increase in cost. With exception of the necessary adjustments which must be made manually, the operation of the improved regulator is entirely automatic, and the invention has proven extremely satisfactory in actual use on internal combustion engine driven air compressors. While the valve 38 has been shown as having its closing motion limited by a stop 40 coacting directly therewith, this stop may be otherwise applied.

It should be understood that it is not desired to limit this invention to the exact details of construction, or to the precise mode of use herein shown and described, for various modifications within the scope of the appended claims, may occure to persons skilled in the art.

I claim:

1. In a regulating system for an internal combustion engine driven air compressor having an air receiver, a carburetor for supplying fuel to the engine, a speed governor for controlling the flow of fuel to the engine from said carburetor, an unloading device for the compressor, a fuel control valve interposed between the carburetor and the engine, and mechanism for controlling the opening of said valve directly in accordance with variations in receiver pressure and entirely independently of said speed governor and of said unloading device.

2. In a regulating system for an internal combustion engine driven compressor having an air receiver, a valve controlled carburetor for supplying fuel to the intake manifold of the engine, a speed governor operable by the engine to control the flow of fuel from said carburetor to said manifold, an auxiliary fuel flow control valve interposed between the carburetor and manifold, a device for unloading the compressor when a predetermined pressure is attained in said receiver, and mechanism operable directly by variations in receiver pressure to control the opening and closing of said auxiliary valve entirely independently of said speed governor and of said unloading device.

3. In a regulating system for an internal combustion engine driven compressor having a compressed air receiver, fuel supply means for the engine, a speed governor for controlling the flow of fuel to the engine from said supply means, a fuel control device interposed between said fuel supply means and the engine, and mechanism for controlling the operation of said fuel control device directly in accordance with variations in receiver pressure and entirely independently of and devoid of influence by said speed governor.

4. In a regulating system for an internal combustion engine driven compressor having a compressed air receiver, a valve for controlling the supply of fuel delivered to the engine, a speed governor operable by the engine to control the delivery of fuel past said valve, an auxiliary fuel flow control valve interposed between said fuel supply valve and the engine, and mechanism operable directly by variations in receiver pressure to control the opening and closing of said auxiliary valve entirely independently of and devoid of influence by said speed governor.

JOHN R. FRANTZ.